United States Patent
Banh et al.

(10) Patent No.: US 7,937,052 B2
(45) Date of Patent: May 3, 2011

(54) MULTIPLE INPUT MULTIPLE OUTPUT SIGNAL RECEIVING APPARATUS WITH OPTIMIZED PERFORMANCE

(75) Inventors: An Tuyen Banh, Murphy, TX (US); Yong Su, Plano, TX (US); Xinguang Xu, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 516 days.

(21) Appl. No.: 11/736,458

(22) Filed: Apr. 17, 2007

(65) Prior Publication Data

US 2007/0298748 A1 Dec. 27, 2007

Related U.S. Application Data

(60) Provisional application No. 60/816,929, filed on Jun. 27, 2006.

(51) Int. Cl.
 *H04B 1/10* (2006.01)
 *H04B 17/00* (2006.01)
(52) U.S. Cl. ............... 455/140; 455/277.2; 455/226.1
(58) Field of Classification Search ............ 455/574, 455/127.1, 132, 134, 135, 226.1, 226.2, 226.3, 455/296, 343.1, 343.2, 101, 114.2, 133, 137, 455/209, 272, 273, 277.1, 277.2, 278.1, 136, 455/140
 See application file for complete search history.

(56) References Cited

U.S. PATENT DOCUMENTS

| | | | |
|---|---|---|---|
| 5,557,603 A * | 9/1996 | Barlett et al. ............... 370/228 |
| 6,029,057 A * | 2/2000 | Paatelma et al. ........... 455/277.2 |
| 6,871,052 B2 * | 3/2005 | Spencer et al. ............. 455/226.2 |
| 7,024,168 B1 * | 4/2006 | Gustafsson et al. .......... 455/135 |
| 2003/0124976 A1 | 7/2003 | Tamaki et al. |
| 2005/0053169 A1 | 3/2005 | Jia et al. |
| 2005/0113048 A1 * | 5/2005 | Miyahara et al. ............. 455/137 |
| 2006/0035674 A1 | 2/2006 | Karaoguz et al. |
| 2006/0141968 A1 * | 6/2006 | Masaki ........................ 455/272 |
| 2007/0026827 A1 * | 2/2007 | Miyano et al. ............... 455/132 |
| 2007/0129020 A1 * | 6/2007 | Anton-Becker ............... 455/78 |
| 2008/0051129 A1 * | 2/2008 | Abe et al. .................... 455/550.1 |
| 2010/0173600 A1 * | 7/2010 | Izumi et al. .................. 455/272 |

OTHER PUBLICATIONS

International Search Report and Written Opinion dated Sep. 12, 2008 cited in PCT/US07/67012.

* cited by examiner

*Primary Examiner* — Blane J Jackson

(57) ABSTRACT

A multiple input multiple output signal receiving apparatus includes a first antenna configured to receive a first radio frequency (RF) signal, a second antenna configured to receive a second RF signal, a superheterodyne receiver, a direct conversion receiver, and an antenna switching module. The superheterodyne receiver is configured to convert one or both of the first and second RF signals into at least one first analog signal. The direct conversion receiver is configured to convert one or both of the first and second RF signals into at least one second analog signal. The antenna switching module couples the first and second antennas to the superheterodyne receiver and the direct conversion receiver, and is configured to selectively direct the first and second RF signals to the superheterodyne receiver and/or the direct conversion receiver, depending on an antenna switch control signal indicating a signal quality derived from the first and second analog signals.

19 Claims, 8 Drawing Sheets

MULTIPLE INPUT MULTIPLE OUTPUT SIGNAL RECEIVING APPARATUS WITH OPTIMIZED PERFORMANCE

CROSS REFERENCE

The present application claims the benefits of U.S. Patent Provisional Application No. 60/816,929 filed on Jun. 27, 2006, entitled "Multiple Receiver Architecture Optimized for Performance, Cost, and Size for Use in MIMO Mobile Wireless Broadband Receiver."

FIELD OF THE INVENTION

The present disclosure relates generally to wireless communications, and more particularly to a multiple input multiple output (MIMO) signal receiving apparatus with optimized performance.

BACKGROUND

MIMO technology has attracted a lot of attention in areas of telecommunications because it allows a significant increase in throughput for any given bandwidth and overall power expenditure. MIMO technology exploits phenomena such as a multi-path propagation to increase data throughput and range, or to reduce bit error rates. In general, MIMO technology increases the spectral efficiency of a wireless telecommunications system.

FIG. 1 illustrates a conventional MIMO signal receiving apparatus 100, which includes two typical direct conversion receivers 102 and 104 coupled to two antennas 106 and 108, respectively. The direct conversion receiver 102 is comprised partially of a radio frequency (RF) filter 110, a low noise amplifier 112, a RF filter 114, a RF amplifier 116, and an IQ demodulator 118, which mixes outputs of the RF amplifier 116 and outputs of a RF local oscillator 119 to generate I and Q baseband signals that are forwarded to baseband low pass filters 120 and 122, respectively. The outputs of the baseband low pass filters 120 and 122 are amplified by variable gain amplifiers 124 and 126, respectively, to produce filtered I and Q signals for analog-to-digital converters (not shown in this figure) to convert into digital signals for further processing. The direct conversion receiver 104 has a functional structure similar to that of the receiver 102. Thus, the detailed description of the receiver 104 is hereby omitted in order to avoid redundancy.

The conventional direct-conversion type MIMO signal receiving apparatus is simple in design and has the advantages of low manufacturing cost and low power consumption. However, it is particularly susceptible to signal interference induced by adjacent out-of-band frequencies (so called jammers). This causes serious problems when such direct-conversion type MIMO signal receiving apparatus is implemented in a mobile device. For example, if the mobile device is moved to an area where there are many high power transmitters operating at frequencies that are very close to the receiver's desired channel, then the receiver will not function properly due to interference from the high power transmitters.

FIG. 2 illustrates a conventional superheterodyne MIMO signal receiving apparatus 200, which includes two typical superheterodyne receivers 202 and 204 coupled to two antennas 206 and 208, respectively. The superheterodyne receiver 202 is comprised partially of an RF filter 210, a low noise amplifier 212, an RF filter 214, an RF amplifier 216, and a mixer 218, which mixes outputs of the RF amplifier 216 and outputs of an RF local oscillator 220. An intermediate frequency surface acoustic wave (IF SAW) filter 222 receives the mixed signal output from the mixer 218 and output a filtered signal to a variable gain amplifier 224. An IQ demodulator 226 mixes outputs of the variable gain amplifier 224 with outputs of an IF local oscillator 228 to generate I and Q baseband signals for analog-to-digital converters (not shown in this figure) to convert into digital signals for further processing. The superheterodyne receiver 204 has a functional structure similar to that of the receiver 202. Thus, the detailed description of the receiver 204 is hereby omitted in order to avoid redundancy.

FIG. 3 illustrates another conventional superheterodyne MIMO signal receiving apparatus 300, which includes two typical superheterodyne receivers 302 and 304 coupled to two antennas 306 and 308, respectively. The superheterodyne MIMO signal receiving apparatus 300 is similar to the superheterodyne MIMO receiving apparatus 200 (shown in FIG. 2) in their functional structures, except that the apparatus 300 has two stages of RF-to-IF conversion, whereas the apparatus 200 has only one stage.

The above-mentioned conventional superheterodyne MIMO signal receiving apparatuses are superior to the direct-conversion type MIMO signal receiving apparatus 100 in terms of rejecting the out-of-band jammers, and therefore is able to receive signals with good quality in an area where there are many high power transmitters operating at the frequencies that are very close to the receiver's desired channel. However, the superheterodyne MIMO signal receiving apparatus 200 has disadvantages, such as high manufacturing costs, high power consumption rates, and a large equipment size, due to its additional devices that are needed for down converting RF signals received from the antennas into IF signals.

SUMMARY

Techniques are described herein for a MIMO signal receiving apparatus, which, in one embodiment, includes a first antenna configured to receive a first radio frequency (RF) signal, a second antenna configured to receive a second RF signal, a superheterodyne receiver, a direct conversion receiver, and an antenna switching module. The superheterodyne receiver is configured to convert one or both of the first and second RF signals into at least one first analog signal. The direct conversion receiver is configured to convert one or both of the first and second RF signals into at least one second analog signal. The antenna switching module couples the first and second antennas to the superheterodyne receiver and the direct conversion receiver, and is configured to selectively direct the first and second RF signals to the superheterodyne receiver and/or the direct conversion receiver, depending on an antenna switch control signal indicating a signal quality derived from the first and second analog signals.

The construction and method of operation of the MIMO signal receiving apparatus, however, together with additional objectives and advantages thereof will be best understood from the following description of specific embodiments when read in connection with the accompanying drawings.

DESCRIPTION

Techniques are described herein for a MIMO signal receiving apparatus with optimized performance. The following merely illustrates various embodiments for purposes of explaining the principles thereof. It is understood that those skilled in the art of telecommunications will be able to devise various equivalents that, although not explicitly described herein, embody the principles described herein.

Figure 4:
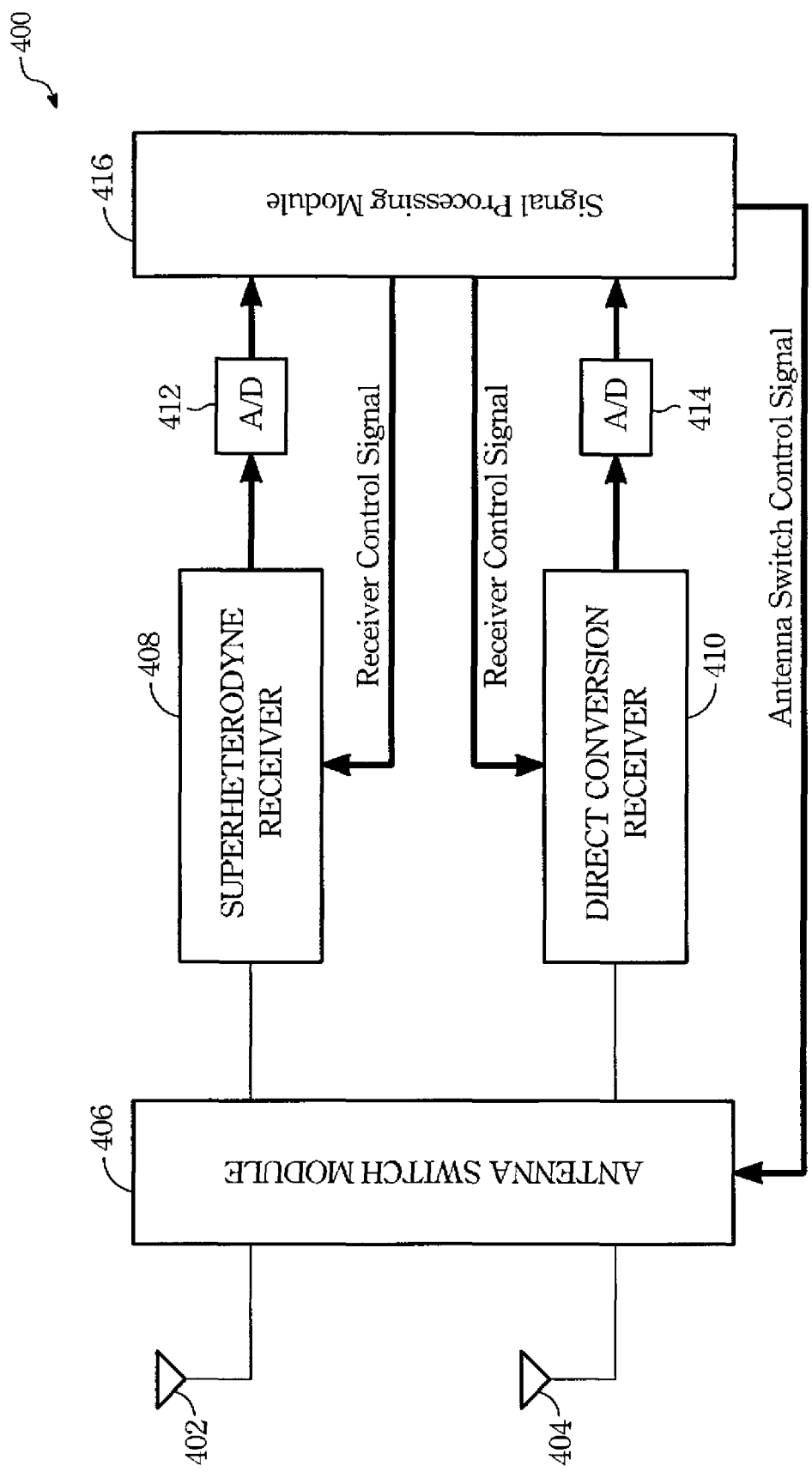
FIG. 4 illustrates a proposed MIMO signal receiving apparatus.

FIG. 4 illustrates a proposed MIMO signal receiving apparatus 400 in accordance with one embodiment. The apparatus 400 includes a first antenna 402 and a second antenna 404 coupled to an antenna switch module 406, which is further coupled to a superheterodyne receiver 408 and a direct conversion receiver 410. The antenna switch module 406 selectively directs a first RF signal received from the first antenna 402 and a second RF signal received from the second antenna 404 to the superheterodyne receiver 408 and/or the direct conversion receiver 410. Analog outputs of the superheterodyne receiver 408 and the direct conversion receiver 410 are converted into a first digital signal and a second digital signal by a first analog-to-digital converter 412 and a second analog-to-digital converter 414, respectively. A signal processing module 416 receives and processes the first and second digital signals output from the first and second analog-to-digital converters 412 and 414 to generate an antenna switch control signal for controlling the antenna switch module 406, and receiver control signals for enabling or disabling the superheterodyne receiver 408 and the direct conversion receiver 410.

Figure 1:
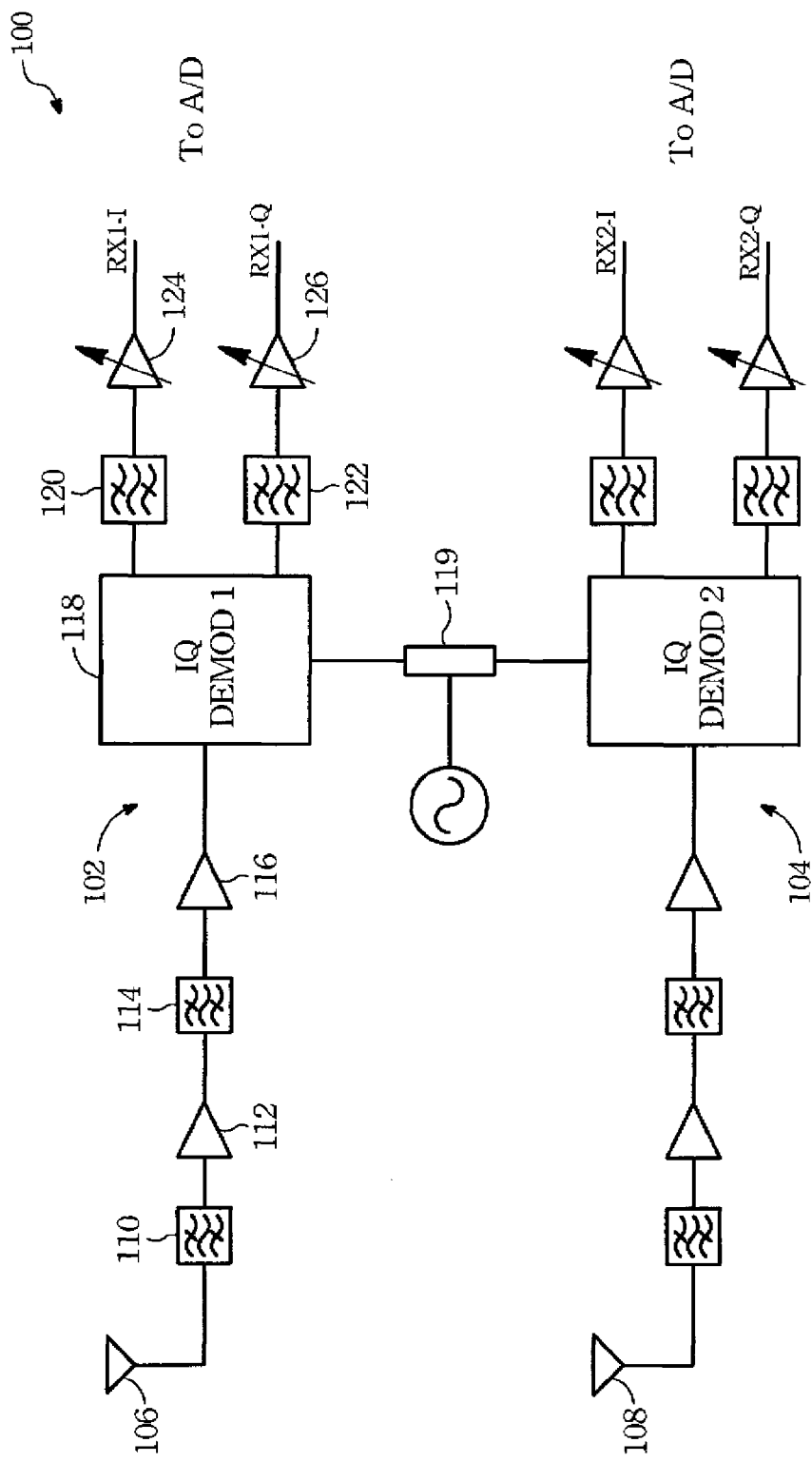
FIG. 1 illustrates a conventional direct conversion MIMO signal receiving apparatus.
Figure 2:
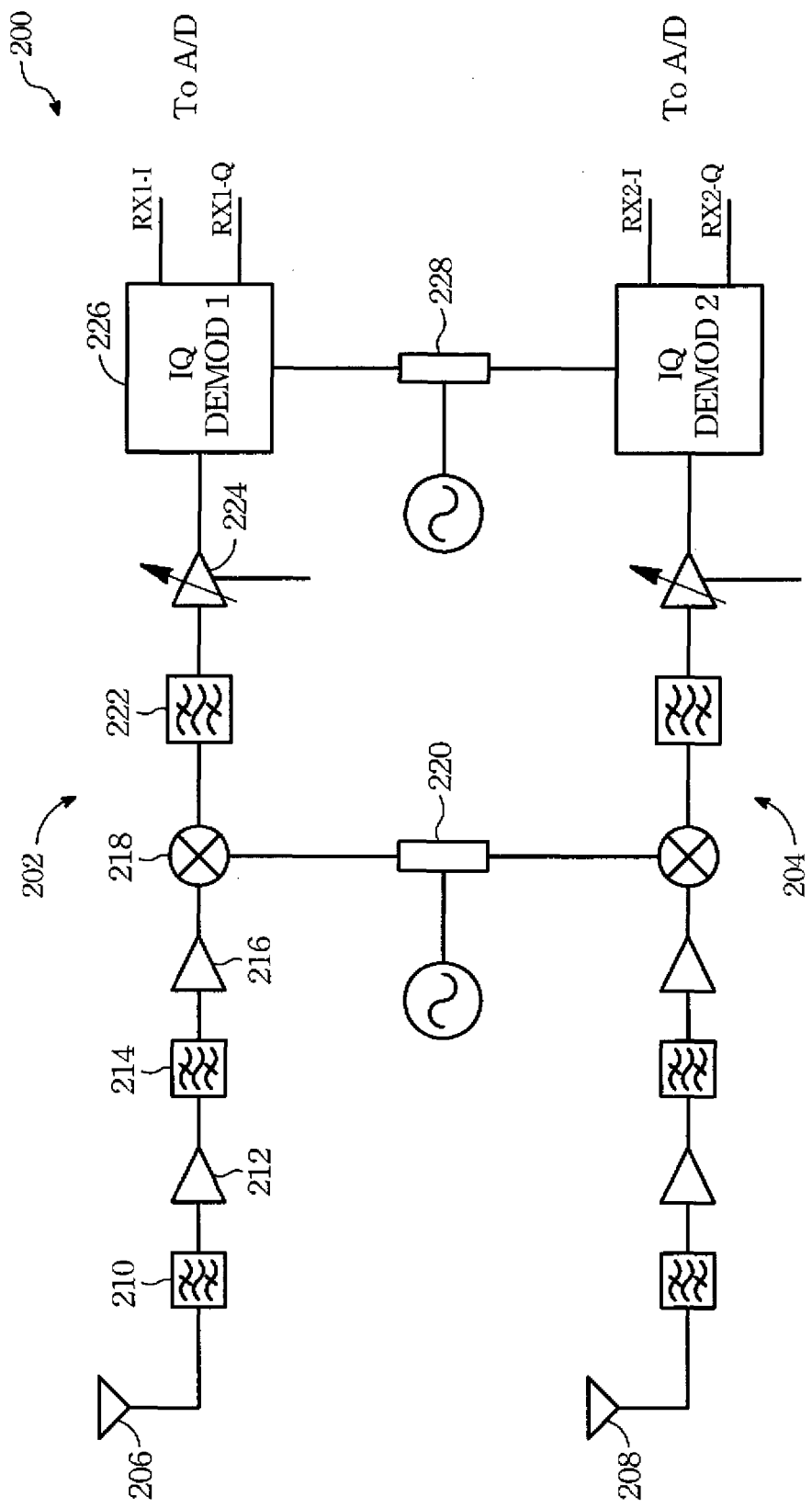
FIG. 2 illustrates a conventional one-stage superheterodyne MIMO signal receiving apparatus.
Figure 3:
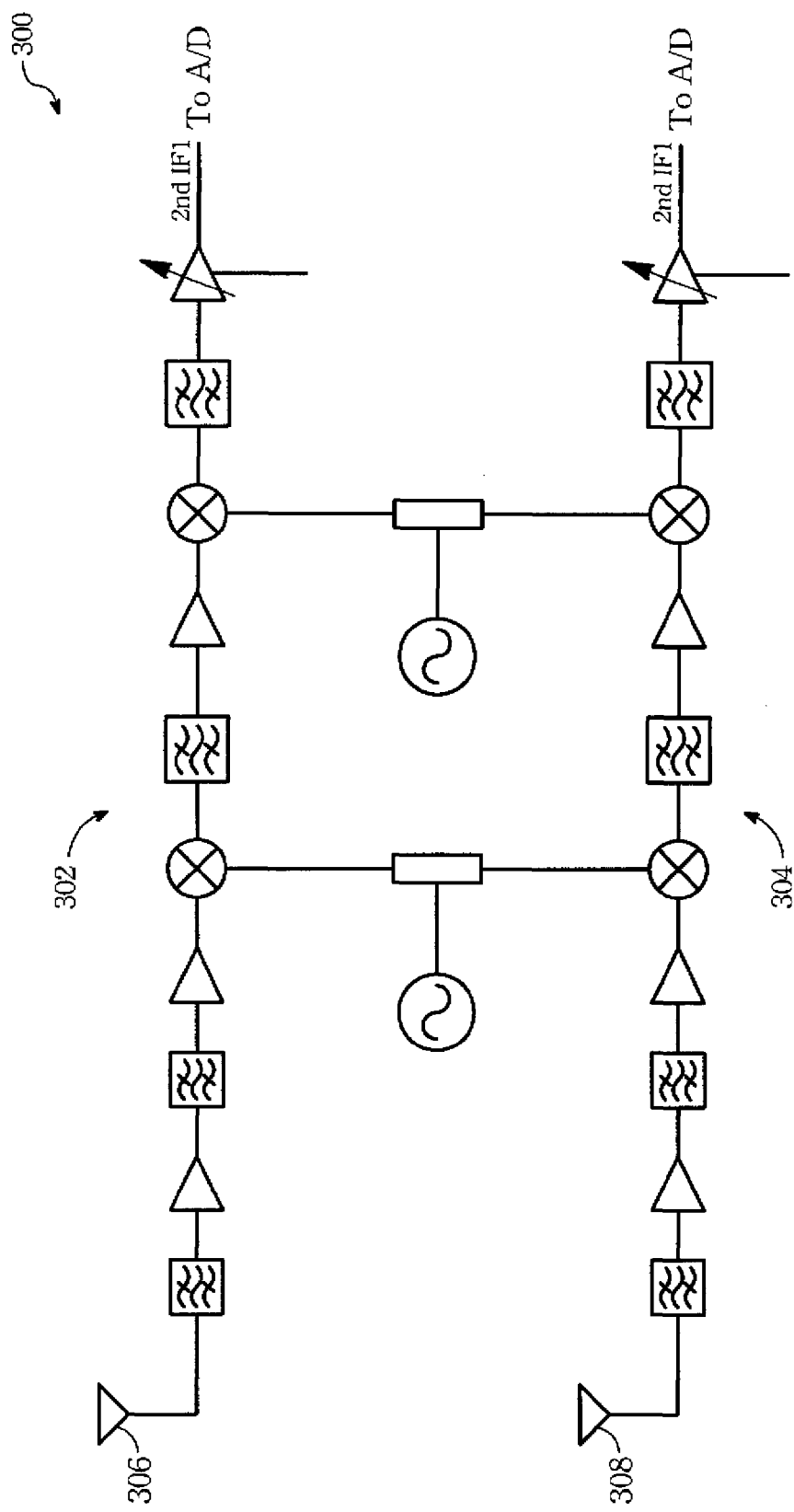
FIG. 3 illustrates a conventional two-stage superheterodyne MIMO signal receiving apparatus.

It is noted that the detailed circuit constructions of the superheterodyne receiver and the direct conversion receiver are well understood by people skilled in the art of telecommunications. For example, FIG. 1 illustrates a typical direct conversion receiver, FIG. 2 illustrates a typical one-stage superheterodyne receiver, and FIG. 3 illustrates a typical two-stage superheterodyne receiver. These receivers, with or without modifications, can be implemented as the superheterodyne receiver and the direct conversion receiver in embodiments described herein.

Figure 5:
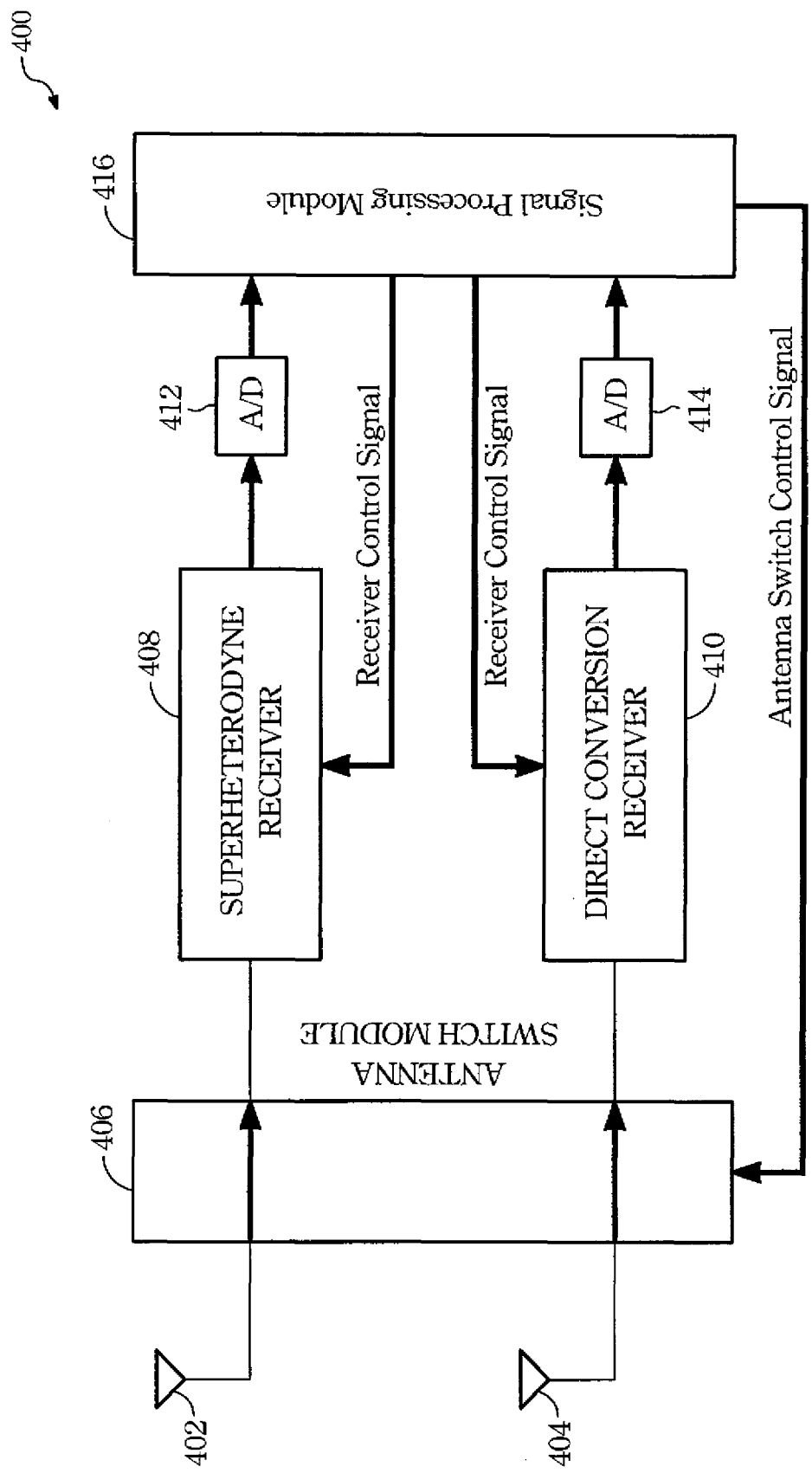
FIG. 5 illustrates a proposed MIMO signal receiving apparatus operating in a MIMO mode where both a superheterodyne receiver and a direct conversion receiver are enabled.

FIG. 5 illustrates the proposed MIMO signal receiving apparatus 400 operating in a MIMO mode where both the superheterodyne receiver 408 and the direct conversion receiver 410 are enabled, in accordance with one embodiment. In an initial state, the antenna switch module 406 directs the first RF signal received from the first antenna 402 and the second RF signal received from the second antenna 404 to the superheterodyne receiver 408 and the direct conversion receiver 410, respectively. The outputs of the superheterodyne receiver 408 and the direct conversion receiver 410 are forwarded to the first and second analog-to-digital converters 412 and 414, respectively, which further generates a first digital signal and a second digital signal to the signal processing module 416.

The signal processing module 416 processes the first digital signal generated by the first analog-to-digital converter 412 and the second digital signal generated by the second analog-to-converter 414 to determine if their corresponding signal-to-noise ratio (SNR) is higher than a predetermined threshold value. If the second digital signal generated by the analog-to-digital converter 414 is determined to have a SNR higher than the predetermined threshold value and the apparatus 400 is not operating in a power saving mode, the signal processing module 416 will generate an antenna switch control signal that controls the antenna switch module to keep directing the first and second RF signals to the superheterodyne receiver 408 and the direct conversion receiver 410, respectively. In such case, the signal processing module 416 will also generate receiver control signals to enable both the superheterodyne receiver 408 and the direct conversion receiver 410. This operation mode is particularly utilized when the apparatus 400 is located in a low interfered area and is not on serious power constraints.

One advantage of the proposed MIMO signal receiving apparatus is that its size, manufacturing costs, and power consumption rates are lower than those of the conventional MIMO signal receiving apparatus that includes two superheterodyne receivers. As understood by people skilled in the art of telecommunications that the manufacturing costs of a superheterodyne receiver are higher than that of a direct conversion receiver. Thus, the manufacturing costs of the proposed apparatus 400 that contains one superheterodyne receiver and one direct conversion receiver would be lower than those of its conventional counterpart, which contains two superheterodyne receivers. Similarly, as understood by people skilled in the art of telecommunications that the size and power consumption rate of a superheterodyne receiver are higher than that of a direct conversion receiver. Thus, the size and power consumption rate of the proposed apparatus 400 that contains one superheterodyne receiver and one direct conversion receiver would be smaller than those of its conventional counterpart, which contains two superheterodyne receivers.

Figure 6:
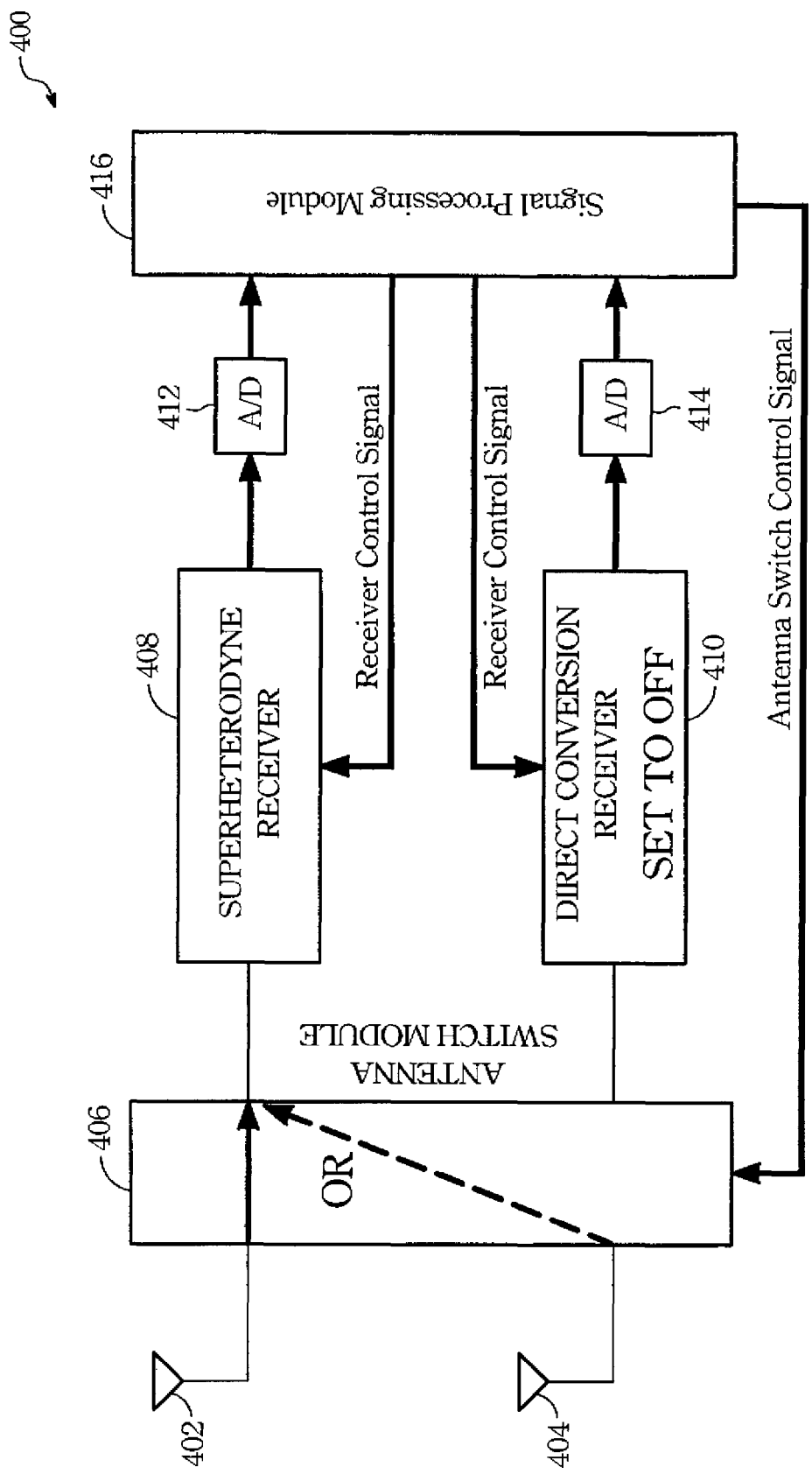
FIG. 6 illustrates a proposed MIMO signal receiving apparatus operating in a single input single output (SISO) mode where a superheterodyne receiver is enabled and a direct conversion receiver is disabled.

FIG. 6 illustrates a proposed MIMO signal receiving apparatus 400 operating in a SISO mode where a superheterodyne receiver 408 is enabled and a direct conversion receiver 410 is disabled, in accordance with one embodiment. In an initial state, the antenna switch module 406 directs the first RF signal received from the first antenna 402 and the second RF signal received from the second antenna 404 to the superheterodyne receiver 408 and the direct conversion receiver 410, respectively. The outputs of the superheterodyne receiver 408 and the direct conversion receiver 410 are forwarded to the first and second analog-to-digital converters 412 and 414, respectively, which further generate a first digital signal and a second digital signal to the signal processing module 416.

The signal processing module 416 processes the first digital signal generated by the first analog-to-digital converter 412 and the second digital signal generated by the second analog-to-converter 414 to determine if their corresponding SNR is higher than a predetermined threshold value. If the second digital signal generated by the analog-to-digital converter 414 is determined to have a SNR lower than the predetermined threshold value, the signal processing module 416 will generate an antenna switch control signal that controls the antenna switch module 406 to direct both the first and second RF signals to the superheterodyne receiver 408. In the mean time, the signal processing module 416 will also generate a first receiver control signal to enable the superheterodyne receiver 408, and a second receiver control signal to disable the direct conversion receiver 410. This operation mode is utilized, for example, when the apparatus 400 is located in a high interfered area where the direct conversion receiver cannot provide quality outputs. The signal processing module 416 will keep monitoring the SNR of the second digital signal. Once it is determined to be higher than the predetermined threshold value, the signal processing module will switch the apparatus 400 back to the MIMO mode.

In addition to the cost, size, and power consumption advantages mentioned above, the proposed MIMO signal receiving apparatus is able to provide diversity gains, such that it can function in high interfered areas where its conventional counterpart, that includes only direct conversion receivers, cannot function properly.

Figure 7:
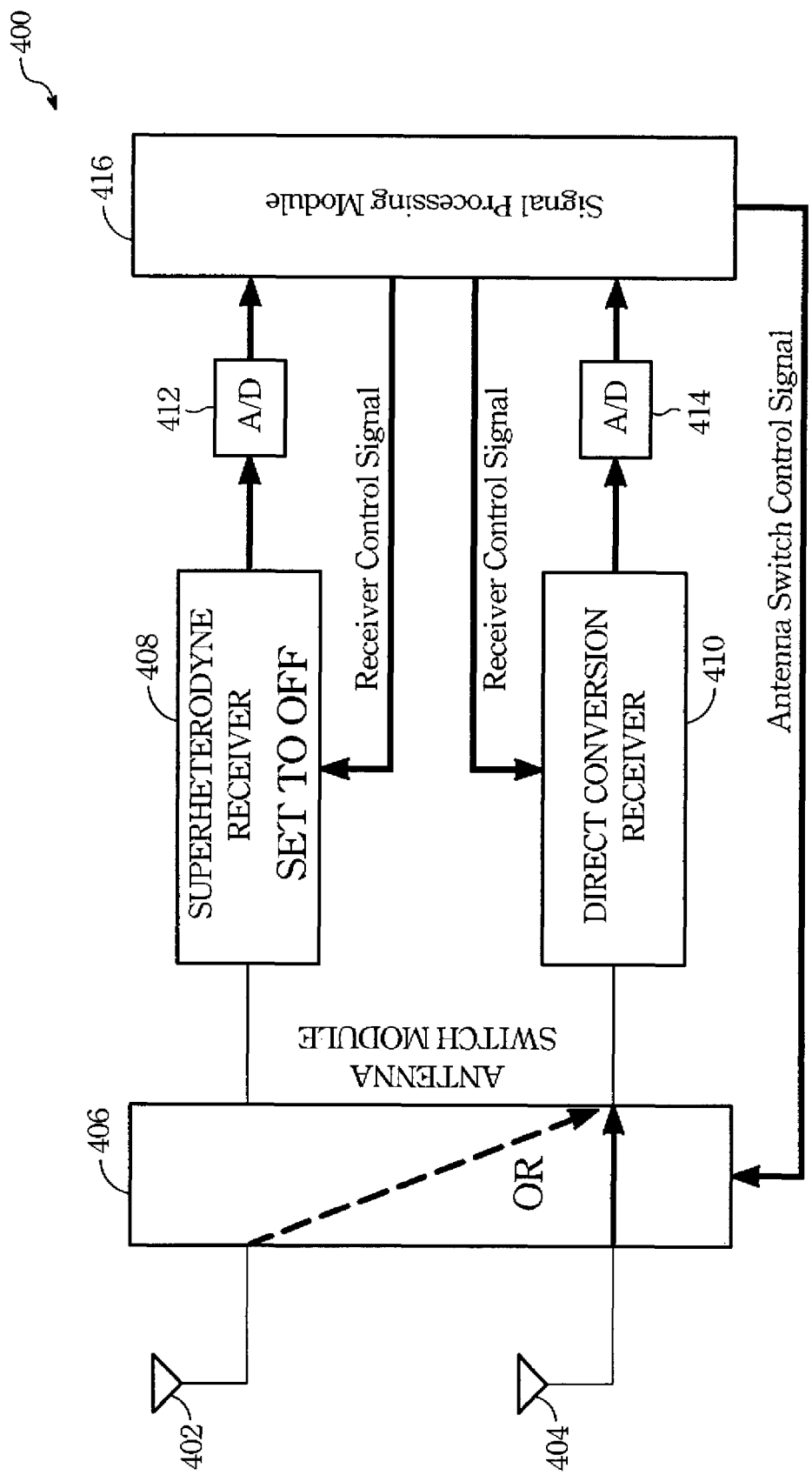
FIG. 7 illustrates a proposed MIMO signal receiving apparatus operating in a SISO mode where a superheterodyne receiver is disabled and a direct conversion receiver is enabled.

FIG. 7 illustrates a proposed MIMO signal receiving apparatus 400 operating in a SISO mode where a superheterodyne receiver 408 is disabled and a direct conversion receiver 410 is enabled, in accordance with one embodiment. In an initial state, the antenna switch module 406 directs the first RF signal received from the first antenna 402 and the second RF signal u received from the second antenna 404 to the superheterodyne receiver 408 and the direct conversion receiver 410, respectively. The outputs of the superheterodyne receiver 412 and the direct conversion receiver 410 are forwarded to the first and second analog-to-digital converters 412 and 414, respectively, which further generate a first digital signal and a second digital signal to the signal processing module 416.

The signal processing module 416 processes the first digital signal generated by the first analog-to-digital converter 412 and the second digital signal generated by the second analog-to-converter 414 to determine if their corresponding SNR is higher than a predetermined threshold value. If the second digital signal generated by the analog-to-digital converter 414 is determined to have a SNR higher than the predetermined threshold value, and the apparatus 400 is operating in a power saving mode, the signal processing module 416 will generate an antenna switch control signal that controls the antenna switch module 406 to direct both the first and second RF signals to the direct conversion receiver 410. In the meantime, the signal processing module 416 will also generate a first receiver control signal to disable the superheterodyne receiver 408, and a second receiver control signal to enable the direct conversion receiver 410. This operation mode is utilized, for example, when the apparatus 400 is located in a low interfered area under power constraints, such as being powered by batteries. In addition to the advantages discussed above, this operation mode allows the apparatus 400 to further operate in a power-efficient mode.

Figure 8:
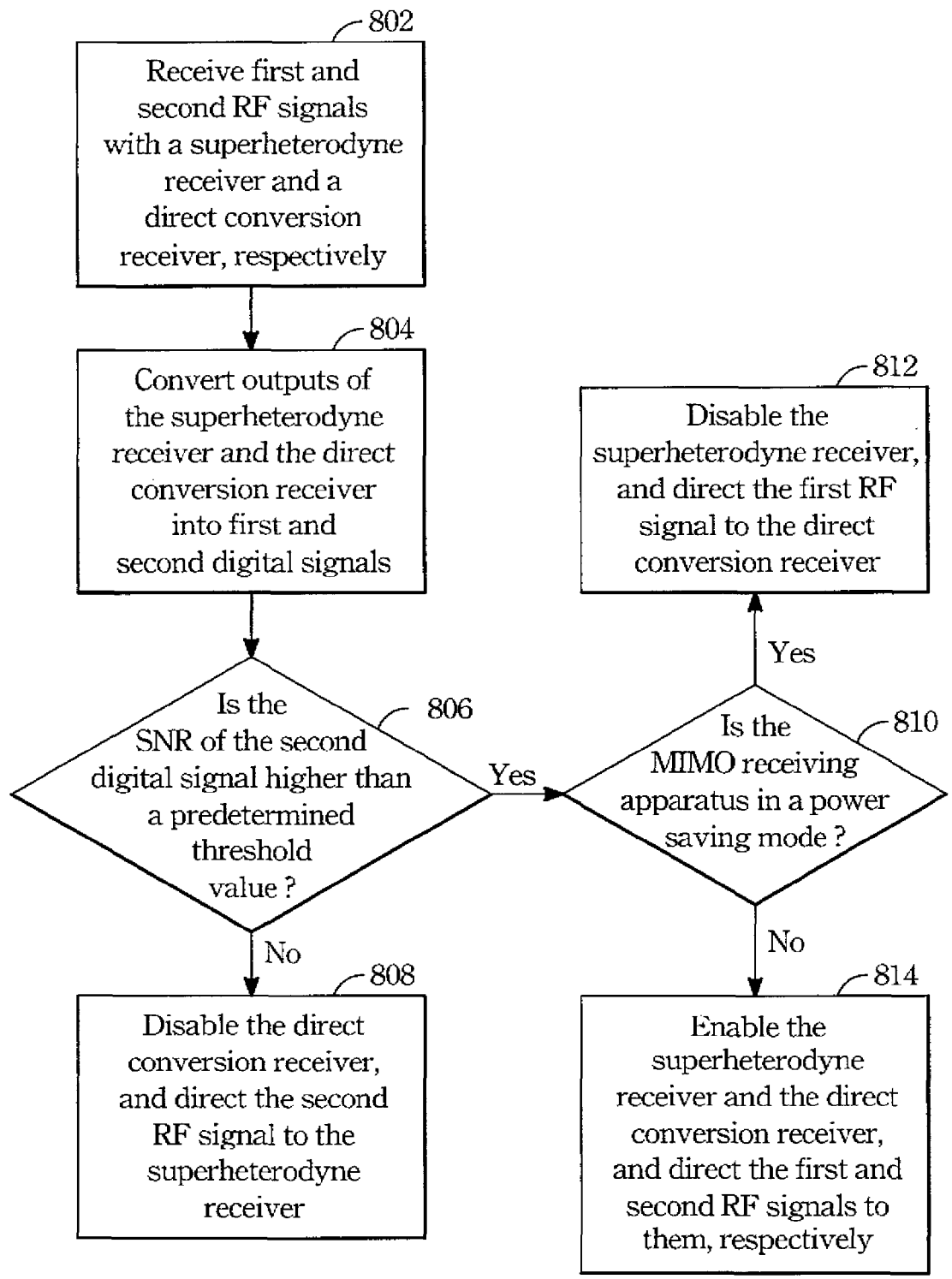
FIG. 8 illustrates a flowchart for explaining how the proposed MIMO signal receiving apparatus operates.

FIG. 8 illustrates a flowchart for explaining how the proposed MIMO signal receiving apparatus operates in accordance with one embodiment. In step 802, the first and second RF signals are received by the superheterodyne receiver and the direct conversion receiver, respectively. In step 804, the outputs of the superheterodyne receiver and the direct conversion receiver are converted into the first and second digital signals. In step 806, the signal processing module determines if the SNR of the second digital signal is higher than the predetermined threshold value. If the SNR of the second digital signal is determined to be lower than the predetermined threshold value, the process proceeds to step 808 where the direct conversion receiver is disabled, the superheterodyne receiver is enabled, and both the first and second RF signals are directed to the superheterodyne receiver. If the SNR of the second digital signal is determined to be higher than the predetermined threshold value, the process proceeds to step 810 where whether the apparatus is operating in a power saving mode is determined. If the apparatus is operating in a power saving mode, the process proceeds to step 812 where the superheterodyne receiver is disabled, the direct conversion receiver is enabled, and both the first and second RF signals are directed to the direct conversion receiver. If the apparatus is not operating in a power saving mode, the process proceeds to step 814 where both the superheterodyne receiver and the direct conversion receiver are enabled, and the first and second RF signals are directed to them, respectively.

It is noted that although the above embodiments use a two-receiver MIMO signal receiving apparatus as an example to explain the principles described herein, the number of receivers that can be implemented is by no means limited to two. More superheterodyne receivers and direct conversion receivers can be implemented in order to achieve further optimal performance.

The above description is intended by way of example only.

What is claimed is:

1. A multiple input multiple output (MIMO) signal receiving apparatus comprising:
   a first antenna configured to receive a first radio frequency (RF) signal;
   a second antenna configured to receive a second RF signal;
   a superheterodyne receiver configured to convert one or both of the first and second RF signals into at least one first analog signal;
   a direct conversion receiver configured to convert one or both of the first and second RF signals into at least one second analog signal;
   an antenna switching module coupling the first and second antennas to the superheterodyne receiver and to the direct conversion receiver, wherein the antenna switching module is configured to selectively direct the first and second RF signals to the superheterodyne receiver and/or the direct conversion receiver in response to an antenna switch control signal indicating a signal quality derived from the first and second analog signals;
   a first analog-to-digital converter configured to convert the first analog signal generated by the superheterodyne receiver into a first digital signal;
   a second analog-to-digital converter configured to convert the second analog signal generated by the direct conversion receiver into a second digital signal;
   a signal processing module coupled between the first and second analog-to-digital converters and the antenna switch module, wherein the signal processing module is configured to generate the antenna switch control signal in order to control the antenna switch module to selectively direct the first and second RF signals to the superheterodyne receiver and/or the direct conversion receiver in response to the first and second digital signals, and wherein the signal processing module is further configured to generate a first receiver control signal to selectively enable or disable the superheterodyne receiver in response to the first and second digital signals.

2. The apparatus of claim 1, wherein the signal processing module is further configured to generate a second receiver control signal to selectively enable or disable the direct conversion receiver in response to the first and second digital signals.

3. The apparatus of claim 2, wherein the signal processing module is further configured to generate the second receiver control signal to disable the direct conversion receiver and configured to generate the antenna switch control signal in order to control the antenna switch module to direct the first and second RF signals to the superheterodyne receiver when a signal-to-noise ratio of the second digital signal is lower than a predetermined threshold value.

4. The apparatus of claim 1, wherein the signal processing module is further configured to generate the first receiver control signal to disable the superheterodyne receiver and configured to generate the antenna switch control signal in order to control the antenna switch module to direct the first and second RF signals to the direct conversion receiver when a signal-to-noise ratio of the second digital signal is higher than the predetermined threshold value when the apparatus is in a power saving mode.

5. The apparatus of claim 1, wherein the signal processing module is further configured to generate the first receiver control signal to enable the superheterodyne receiver and a second receiver control signal to enable the direct conversion receiver, and configured to generate the antenna switch control signal in order to control the antenna switch module to direct the first and second RF signals to the superheterodyne receiver and the direct conversion receiver, respectively, when a signal-to-noise ratio of the second digital signal is higher than the predetermined threshold value when the apparatus is not in a power saving mode.

6. A method in a multiple input multiple output (MIMO) signal receiver apparatus comprising:
   receiving a first radio frequency (RF) signal with a first antenna;
   receiving a second RF signal with a second antenna;
   selectively directing the first and second RF signals to a superheterodyne receiver and a direct conversion receiver, respectively, using an antenna switching module coupled to the first and second antennas, and coupled to the superheterodyne and direct conversion receivers, wherein selectively directing is based on when a signal-to-noise ratio derived from an output of the direct conversion receiver is higher than a predetermined threshold value when the receiver apparatus is not in a power saving mode; and
   selectively directing both the first and second RF signals to the superheterodyne receiver when the signal-to-noise ratio derived from the output of the direct conversion receiver is lower than the predetermined threshold value.

7. The method of claim 6, further comprising selectively directing both the first and second RF signals to the direct conversion receiver when the signal-to-noise ratio derived from the output of the direct conversion receiver is higher than the predetermined threshold value when the receiver apparatus is in a power saving mode.

8. The method of claim 7, further comprising setting the superheterodyne receiver to a power off state.

9. The method of claim 6, further comprising converting an output of the superheterodyne receiver into a first digital signal.

10. The method of claim 6, further comprising converting the output of the direct conversion receiver into a second digital signal.

11. The method of claim 10, further comprising processing the second digital signal to determine whether the signal-to-noise ratio thereof is higher than the predetermined threshold value.

12. A multiple input multiple output (MIMO) signal receiving apparatus comprising:
   a first antenna configured to receive a first radio frequency (RF) signal;
   a second antenna configured to receive a second RF signal;
   a superheterodyne receiver configured to convert one or both of the first and second RF signals into at least one first analog signal;
   a direct conversion receiver configured to convert one or both of the first and second RF signals into at least one second analog signal;
   an antenna switching module configured to couple the first and second antennas to the superheterodyne receiver and to the direct conversion receiver for selectively directing the first and second RF signals to the superheterodyne receiver and/or the direct conversion receiver;
   a first analog-to-digital converter configured to convert the first analog signal generated by the superheterodyne receiver into a first digital signal;
   a second analog-to-digital converter configured to convert the second analog signal generated by the direct conversion receiver into a second digital signal;
   a signal processing module coupled between the first and second analog-to-digital converters and the antenna switch module, wherein the signal processing module is configured to control the antenna switch module to selectively direct the first and second RF signals to the superheterodyne receiver and/or the direct conversion receiver in response to the first and second digital signals, and wherein the signal processing module is configured to disable the direct conversion receiver and to control the antenna switch module to direct the first and second RF signals to the superheterodyne receiver when a signal-to-noise ratio of the second digital signal is lower than a predetermined threshold value.

13. The apparatus of claim 12, wherein the signal processing module is configured to disable the superheterodyne receiver and to control the antenna switch module to direct the first and second RF signals to the direct conversion receiver when the signal-to-noise ratio of the second digital signal is higher than the predetermined threshold value and the MIMO signal receiving apparatus is in a power saving mode.

14. The apparatus of claim 12, wherein the signal processing module is configured to enable both the superheterodyne receiver and the direct conversion receiver, and to control the antenna switch module to direct the first and second RF signals to the superheterodyne receiver and the direct conversion receiver, respectively, when the signal-to-noise ratio of the second digital signal is higher than the predetermined threshold value when the apparatus is not in a power saving mode.

15. A method in a multiple input multiple output (MIMO) signal receiver apparatus comprising:
   receiving a first radio frequency (RF) signal with a first antenna;
   receiving a second RF signal with a second antenna;
   selectively directing the first and second RF signals to a superheterodyne receiver and a direct conversion receiver, respectively, using an antenna switching module coupled to the first and second antennas, and coupled to the superheterodyne and direct conversion receivers, wherein selectively directing is based on when a signal-to-noise ratio derived from an output of the direct conversion receiver is higher than a predetermined threshold value when the receiver apparatus is not in a power saving mode; and
   selectively directing both the first and second RF signals to the direct conversion receiver when the signal-to-noise ratio derived from the output of the direct conversion receiver is higher than the predetermined threshold value when the receiver apparatus is in a power saving mode.

16. The method of claim 15, and further comprising selectively directing both the first and second RF signals to the superheterodyne receiver when the signal-to-noise ratio derived from the output of the direct conversion receiver is lower than the predetermined threshold value and the MIMO signal receiving apparatus is in a power saving mode.

17. The method of claim 16, and further comprising converting a first analog signal output by the superheterodyne receiver to a first digital signal and converting a second analog signal output by the direct conversion receiver to a second digital signal.

18. The method of claim 17, and further comprising disabling the superheterodyne receiver when a signal-to-noise ratio of the second digital signal is higher than the predetermined threshold.

19. The method of claim 17, and further comprising enabling both the superheterodyne receiver and the direct conversion receiver and directing the first and second RF signals to the superheterodyne receiver and the direct conversion receiver, respectively, when a signal-to-noise ratio of the second digital signal is higher than the predetermined threshold value when the MIMO signal receiver apparatus is not in a power saving mode.

* * * * *